United States Patent
Kadaba et al.

[11] Patent Number: 5,973,834
[45] Date of Patent: Oct. 26, 1999

[54] METHOD FOR THE MANUFACTURE OF A LIGHT-POLARIZING POLYVINYLENE SHEET

[75] Inventors: Narendra S. Kadaba, Newton; Lori P. Shah, Bedford, both of Mass.

[73] Assignee: Polaroid Corporation, Cambridge, Mass.

[21] Appl. No.: 08/994,885

[22] Filed: Dec. 19, 1997

[51] Int. Cl.$^6$ .............................. G02B 1/00; B29D 11/00
[52] U.S. Cl. .................... 359/490; 264/1.34; 264/108; 264/289.6
[58] Field of Search .................... 264/1.34, 108, 264/289.6, 1.31; 359/490; 428/910

[56] References Cited

U.S. PATENT DOCUMENTS

| | | |
|---|---|---|
| 2,173,304 | 9/1939 | Land et al. . |
| 2,255,940 | 9/1941 | Rogers . |
| 2,306,108 | 12/1942 | Land et al. . |
| 2,445,555 | 7/1948 | Binda . |
| 2,674,159 | 3/1954 | Binda . |
| 3,914,017 | 10/1975 | Bedell et al. . |
| 5,666,223 | 9/1997 | Bennett et al. . |

Primary Examiner—Mathieu D. Vargot
Attorney, Agent, or Firm—Renato M. de Luna

[57] ABSTRACT

A method is provided for the manufacture of a polyvinylidene-based light polarizer (cf., a "K Sheet"-type polarizer). In one embodiment, the polyvinylidene chromophore of said polarizer is produced by the acid catalyzed dehydration of an oriented polymeric starting material, the acid catalyst being introduced in the method as a bonding agent used to secure the starting material to a carrier web (or other supporting substrate). Advantages of the method include reduced frequency of "streaking" and "mottling"; good processing speed; and the ability to use a low acid concentration, resulting in a correspondingly low-corrosion processing environment.

17 Claims, 1 Drawing Sheet

METHOD FOR THE MANUFACTURE OF A LIGHT-POLARIZING POLYVINYLENE SHEET

FIELD

The present invention is directed to a method for the manufacture of a light-polarizing polyvinylene sheet (cf., a "K Sheet"-type polarizer), particularly wherein the polyvinylene chromophore of said light-polarizing sheet is formed by acid catalyzed dehydration of a sheet of polyvinylalcohol, the acid catalyst being directly coated or otherwise deposited onto said polyvinylalcohol sheet.

BACKGROUND

Normally, light waves vibrate in a large number of planes about the axis of a light beam. If the waves vibrate in one plane only, the light is said to be plane polarized. Several useful optical ends and effects can be accomplished by plane polarized light. For example, in the manufacture of electrooptical devices, such as liquid crystal display screens, crossed polarizers can be used in conjunction with an addressable liquid crystal interlayer to provide the basis for image formation. In the field of photography, polarizing filters have been used to reduce glare and the brightness of specular reflection. Polarizing filters have also been used for the reduction of glare on CRT display monitor screens.

While several materials possess to a degree inherent polarizing properties, synthetic polarizing materials based on thin polymeric films are desirable for their comparative ease of manufacture and handling, their ability to be tailored for particular uses, and the comparative ease with which they may be incorporated into desired end products.

The production of linear light polarizing films has been well described in the art. Linear light polarizing films, in general, owe their properties of selectively passing radiation vibrating along a given electromagnetic radiation vector (and absorbing electromagnetic radiation vibrating along a second given electromagnetic radiation vector) to the anisotropic character of the transmitting film medium.

Dichroic polarizers are linear polarizers of an absorptive variety that owe their light-polarizing capabilities to the vectorial anisotropy of their absorption of incident light waves. The term "dichroism" is used herein as meaning the property of differential absorption of the components of an incident beam of light, depending upon the vibration directions of said component. Thus, light entering a dichroic film encounters two different absorption coefficients—one low and one high. The emerging light vibrates predominantly in the direction of low absorption.

Among the several varieties of synthetic linear light polarizers are the so-called "K Sheet"-type polarizers, which are characterized by their comparatively good environmental resistance to heat and humidity. As described in U.S. Pat. Nos. 2,173,304 and 2,306,108, both issued to E. H. Land and H. G. Rogers, "K Sheet"-type polarizers are usually prepared by at least partially dehydrating a hydroxylated polymer, such as polyvinylalcohol. In particular, before or after a molecular orientation step (i.e., stretching), a sheet of polyvinylalcohol is dehydrated by exposure in an elevated temperature environment to fumes of a very strong acid catalyst; water molecules are liberated, thereby forming a polymer with conjugated vinylene blocks. In the resultant sheet, incident light is linearly polarized by transit through the oriented polyvinylene molecules.

While useful "K Sheet"-type polarizers can be made by conventional fuming processes, in certain processing environment, and in the absence of suitable controls, said processes can result in polarizers having present a degree of "streaking" and "mottling" unsuitable or undesirable for certain applications, particularly those requiring a high level of optical precision. One condition believed to contribute to these artifacts are environmentally-influenced fluctuations in acid fuming that result in a less than uniform catalytic dehydration. For example, even in a hermetically-sealed enclosure, the elevated temperatures of a fuming oven can produce thermal currents that disrupt or otherwise interfere with uniform fuming. In light of such potential variability, need is present for a method for the manufacture of a polyvinylene-based polarizer that reduces reliance—or more preferably does not involve—the step of acid fuming.

SUMMARY

The present invention provides a method for the manufacture of a light-polarizing polyvinylene sheet (i.e., a "K Sheet"-type polarizer). The method commences by unidirectionally stretching a sheet comprising a hydroxylated linear high polymer sufficiently to molecularly orient the sheet's polymeric component along the stretching direction. The oriented polymeric sheet is then bonded to a support (e.g., a flexible carrier web or a rigid supporting substrate) by applying a solution of acid at an interface between the oriented sheet and the support. Finally, in accordance with the method's principal mode of practice, the web-bonded sheet is heated at a temperature and for a duration sufficient to effect acid catalyzed dehydration of said sheet to thereby form therein light-absorbing vinylene block segments.

Among its advantages is the method's resistance to the incidental, unintended, and undesirable generation of "streaks" or "mottle" that would otherwise degrade uniform optical density in a resultant polarizer. Further, because the method's interfacial incorporation of acid makes unnecessary a later acid fuming step, the method provides opportunity for the production of polarizers at comparatively faster processing rates and greater yields. Interfacial incorporation also allows for the use of lower concentrations of acid than otherwise practical with fuming, resulting overall in a safer, less corrosive processing environment.

In light of the above, it is an object of the present invention to provide a method for the manufacture of a light-polarizing polyvinylene sheet, the method involving an interfacial incorporation of a dehydration acid catalyst.

Another object of the present invention is to provide a method for the manufacture of a light-polarizing polyvinylene sheet not involving the step of acid fuming.

Another object of the present invention is to provide a method for the manufacture of a polyvinylene-based polarizer, the steps of which can be easily assimilated into conventional polarizer manufacturing processes.

Another object of the present invention is to provide a method for making polyvinylene-based polarizers that is more robustly resistant to the environmental influences that effect "streaking" and "mottling" in product polarizers.

Other features and advantages of this invention will become apparent from the following detailed description of preferred embodiments of the invention, taken in conjunction with the accompanying drawings.

DETAILED DESCRIPTION

The present invention provides a novel method for making a light-polarizing polyvinylene sheet from a hydroxylated linear polymeric starting material.

The method commences by unidirectionally stretching a sheet of said starting material sufficiently to molecularly orient the linear polymers of the sheet along the stretching direction. Then, the oriented polymeric sheet is bonded to a flexible carrier web (e.g., polyester or cellulose acetate butyrate) or a rigid substrate (e.g., glass) by applying a solution of acid at an interface between the oriented sheet and the carrier web or rigid substrate.

Typically, the acid employed as the bonding fluid will be selected from those employed in the acid fuming steps of conventional K-Sheet manufacturing processes. See e.g., U.S. Pats. Nos. 2,306,108 (Land and Rogers); 2,255,940 (Rogers); 2,173,304 (Land and Rogers); and 2,674,159 (Binda). But, any acid (or other agent) which acts in the nature of a dehydration catalyst capable of effecting in the presence of heat (or other appropriate processing condition) the removal of 2nH and nO atoms from the hydroxylated moieties of said linear polymer to leave conjugated vinylene units can be considered for use. Typical acids include hydrochloric acid, hydrobromic acid, hydroiodic acid, and sulphuric acid in methanol. Hydrochloric acid is preferred.

Supported on a carrier web (or rigid substrate), the stretched sheet—itself somewhat fragile and susceptible to wrinkling and creasing—is now more durable, and more easily manipulated and better protected against accidental and unintended damage resultant of said manipulation. More importantly, with acid catalyst present in its structure, the acid bonded laminate can be converted into a sheet of light polarizing polyvinylene. Conversion is typically accomplished by heating the web-borne oriented sheet at a temperature and duration sufficient to effect acid catalyzed dehydration of said sheet, thereby forming light absorbing vinylene block segments in said polymers.

Although the polyvinylene sheet made by conversion can be used as a light polarizer, the optical and physical properties thereof can be improved by additional steps. For example, the dichroic ratio of the polyvinylene sheet can be substantially improved by the extension step described in U.S. Pat. No. 5,666,223, issued to Bennett et al. on Sep. 9, 1997. Likewise, the environmental stability of the sheet can be improved by the boration steps described in U.S. Pat. Nos. 2,445,555 and 2,453,186, 2,554,850, and 2,674,159, all issued to F. J. Binda. The preferred mode for practicing the inventive methodology is in combination with said "extension" step and said "boration" steps.

Figure 1:
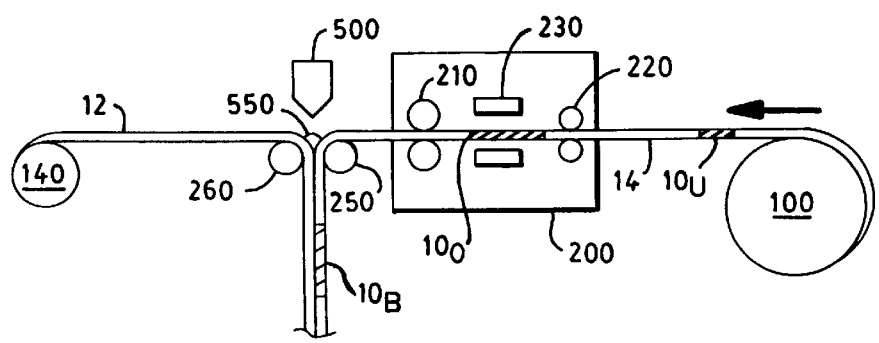
FIGS. 1 and 2, together, represent schematically a method for making a light-polarizing polyvinylene sheet, the method conducted in accordance with an embodiment of the present invention.
Figure 2:
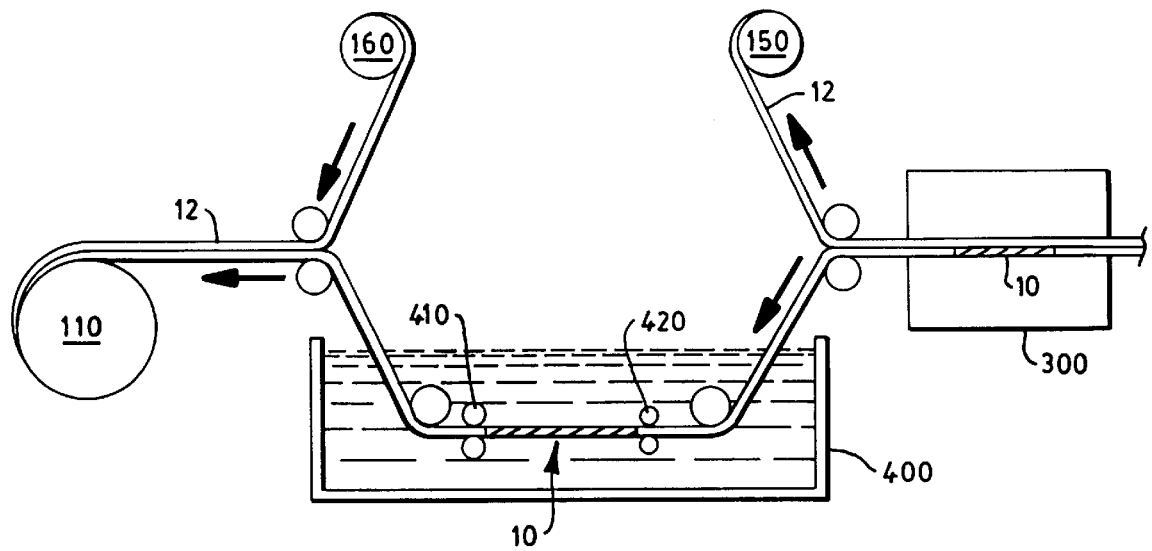

To further explain the present invention, reference is now made to FIGS. 1 and 2. The method represented by FIGS. 1 and 2 is exemplary in nature, and should not be construed as a limitation to the full scope of the invention defined in the claims.

As shown in FIG. 1, the unidirectional stretching of light polarizing polyvinylene sheet 10 employs as a starting material a polymeric sheet of a hydroxylated linear high polymer $10_U$. The polymeric starting material $10_U$ may be selected from any hydroxylated linear high polymer or derivative thereof, or any compound which can be converted into a hydroxylated linear high polymer. Accordingly, one could make use of polyvinyl acetals, polyvinyl ketals, and polyhydroxy alkanes as materials from which the molecularly oriented sheet or film can be formed. The term "acetals and ketals of polyvinyl alcohol" is to be understood as generic to the class of resins formed from polyvinylacetate by the successive or combined steps of hydrolysis and condensation with aldehydes and ketones, respectively. In any event, despite the broad range of materials that can be employed, polyvinyl-alcohol (PVA)—owing to its ready availability and well-known properties—is preferred. It should be pointed out, however, that when the invention is practiced with mixed polymers or derivatives of polyvinyl alcohol, incomplete derivatives should be used; i.e., some of the hydroxyl groups of the polyvinyl alcohol should remain unreacted in order to enter into a subsequent esterification reaction.

The polymeric sheet $10_U$ is transported, conveyed, or otherwise moved to a suitable stretching device 200 (or other like mechanisms or systems), whereupon the unprocessed polymeric sheet $10_S$ is unidirectionally stretched. The polyvinylalcohol material used is typically from about 0.038 to about 0.076 mm in thickness and is preferably about 0.046 mm thick. The sheet is initially stretched uniaxially about 3.6 to about 5.0 times its original length. Although stretched lengthwise, changes in width and thickness will also result. For example, an initially 0.046 mm thick, 1140 mm wide, polyvinyl alcohol sheet stretched to approximately 4.8 times its normal dimensions obtains a thickness of about 0.001 mm and a width of about 1054 mm.

The stretching step—effecting molecular orientation of the polymeric starting material—is generally conducted under the influence of moderate heat, preferably at a temperature at or above the glass transition temperature of the polymeric starting material. Heating can of course be accomplished by any means suitable for elevating the temperature of the polymeric starting material.

As illustrated in FIG. 1, stretching is effected in hot air oven 200 (heated to a temperature of about 125° C.) by the provision therein of heat generating elements 230, fast rollers 210, and slow rollers 220. Difference in the rotational rate between rollers 210 and 220 can be exploited to create corresponding tension in the area of web 14 transported therebetween. When said area is submitted contemporaneously to heat emitted by heat generating elements 230, stretching of web 14 is facilitated and more desirably effected. Other methods for stretching sheet $10_U$ will be apparent to those skilled in the art in light of the present disclosure. Methods for stretching polymeric sheets are described in such patents as U.S. Pat. No. 2,547,736, issued to R. Blake, U.S. Pat. No. 2,547,763, issued to Edwin H. Land and W. Ryan, and U.S. Pat. No. 2,804,652, issued to S. Balkan.

Following molecular orientation, as shown in FIG. 1, the oriented sheet $10_O$ is conveyed into a nip formed by two abutting pressure rollers 250 and 260, whereat said sheet $10_O$ is brought into interfacial association with carrier web 12, the web being distributed from supply roll 140.

Any of a variety of materials can be used for the carrier web 12. Suitable carrier web materials include known polymeric sheet materials such as the cellulose esters (e.g., nitrocellulose, cellulose acetate, cellulose acetate butyrate), polyesters, polycarbonates, vinyl polymers such as the acrylics, and other support materials that can be provided in a sheet-like form. Polyesters are especially useful, depending on the particular application and the requirements thereof. A preferred polyester is polyethylene terephthalate, available under the Mylar and Estar tradenames, although other polyethylene terephthalate materials can be employed. The thickness of the support material will vary with the particular application. In general, from the standpoint of manufacturing considerations, supports having a thickness of about 0.5 mil (0.013 mm) to about 20 mils (0.51 mm) can be conveniently employed.

Although for many applications, the support material will be light-transmissive, practice of the inventive methodology is not limited to any specific optical property of the support. For certain applications—the manufacture of a reflective polarizer being one example—it may be desirable to employ a light-reflective support material. The support also need not be optically-inactive or comprise a unitary structure. Among the supports contemplated are reflective and transmissive holographic components, laminates, and optical elements; lens blanks for optical eyewear; optical retarders, diffusers, defractors, and refractors; and the rigid plastic and glass liquid crystal alignment plates employed in the manufacture of liquid crystal display devices.

As shown in FIG. 1, when brought together at the nip between rollers 250 and 260, a crotch is formed between carrier web 12 and oriented sheet $10_O$. In accordance with the present invention, a solution of acid is dripped down from reservoir 500 into the crotch, where it typically collects as a bead, and is ultimately spread throughout the interface between the sheet and web as those sheets are laminated together between rollers 250 and 260. The acid not only effects an adhesion between web 12 and sheet $10_O$, it also provides the catalyst needed for dehydration in the conversion step conducted further downstream in the process, thus rendering unnecessary later acid fuming steps.

Typically, to assure uniform spreading, the acid will be dripped into the crotch at a rate and at a quantity sufficient to form and maintain continuously therein a crossaxis bead 550 throughout the lamination process. Other factors influencing the uniformity of spreading, and which should be considered, include the viscosity and composition of the acid solution; the length of the crossweb axis; and the thicknesses, dimensions, and composition of web 12 and sheet $10_O$.

Inasmuch as the acid is provided directly onto and in intimate confinement with the oriented sheet $10_O$, the concentration of the acid used for bonding need not approach the high concentrations used in conventional processes involving acid fuming. Although several factors will effect the determination of the appropriate concentration, when using hydrochloric acid, a concentration in the range of approximately 0.1N to approximately 3.0N may be utilized, depending on the speed, pressure, and temperature of lamination. Higher acid concentrations may be possible with further modifications to other processing parameters.

Although the interfacial incorporation of acid by the dripping methodology described above is preferred in lamination to a flexible carrier web, other methods are possible and—in the case of lamination to a rigid substrate—may be more desirable and/or necessary. For example, acid can be applied onto the carrier web 12 by spraying, brushing, coating, or like application, followed by bringing the carrier web into interfacial association with the oriented sheet $10_O$. Or, the acid can be applied onto the oriented sheet $10_O$ first, which is then brought into interfacial association with the carrier web 12. Or, the acid can be applied to a rigid glass substrate, followed by depositing and laminating the oriented sheet $10_O$ onto the acid-coated surface. Coating methods, like slot coating and gravure coating, can also be used to apply the acid.

Subsequent to the acid-bonding step, the acid containing laminate $10_B$ is conveyed, transported, or otherwise moved to an oven 300 (or other suitable heating means), where it is heated to a temperature at which a polarizing stain appears in the sheet, thus indicating that the oriented hydroxylated linear polymer molecules in the sheet have been converted into the desired dichroic molecules of polyvinylene, i.e., a hydrocarbon long straight chain molecule having extended systems of conjugated double bonds. Satisfactory results have been achieved with temperatures in the neighborhood of 220° F. (104° C.) to 400° F. (204° C.) for about one-half minute or longer.

The optical properties of the finished polarizer 10 can be controlled as a function of the temperature in the oven in which conversion takes place, as well as the duration which the catalyzed sheet is subjected to oven heat. If the temperature of the oven is maintained at about 325° F. and the other conditions of the process remain constant, as heretofore specified, the polarizer produced will transmit approximately 38% of the incident light. If the temperature of the oven is maintained at about 360° F. and the other conditions remain constant, a single sheet of the polarizing material will transmit approximately 32% of the incident light, and two crossed sheets will transmit no more than 0.01% of the incident light. It is thus apparent that if a high transmission polarizer is desired, a relatively low oven temperature will produce the desired result; while if a somewhat lower transmission polarizer is sought with a higher cutoff, the higher oven temperature should be employed.

While the polyvinylene sheet 10 resultant of conversion can function as a light polarizer, the optical properties of said sheet 10—as indicated above—can be improved by the processes described in U.S. Pat. No. 5,666,223, issued to Bennett et al. on Sep. 9, 1997. More particularly, assuming that the manufacture of polyvinylene sheet 10 involved a two-to five-fold elongation (i.e., a 2.0× to 5.0× stretch) of the starting polymeric sheet $10_U$, improvements in photopic and spectral dichroic ratio can be accomplished by unidirectionally extending (cf., restretching) polyvinylene sheet 10. Good results have been obtained when said extension increases the length of sheet 10 an additional 10% to 160% such that the final degree of stretch is at least 4.8 times (preferably much higher) the original predetermined length of sheet $10_U$. The polarizers resultant of extension are characterized by their highly desirable peak photopic dichroic ratio, $R_D$, of greater than approximately 45. Further, in addition to improving polarizing properties, the extension step is highly useful in preventing the discoloration of the light-polarizing polyvinylene sheet and increasing its stability to ultraviolet radiation.

As shown in FIG. 2, the extension step is desirably—but not necessarily—carried out in a boric bath 400. In the course of conducting such step, the sheet 10 containing the oriented poly(vinylene-co-vinyl alcohol) molecules is treated with an aqueous solution of boric acid and/or borax contemporaneously with or followed by said extension.

Extension of converted and oriented sheet 10 can be accomplished in a manner similar to the aforediscussed stretching of polymeric starting material $10_U$, i.e., by the use of fast and slow rollers 410 and 420. As with the earlier stretching step, alternative stretching methodologies can be employed. Extension, regardless of stretching methodology, will be facilitated by removal of carrier web 12 from sheet 10 prior to extension, as shown in FIG. 2.

Although extension is depicted in FIG. 2 as occurring in boric bath 400, the present invention is not limited to time and location of the extension step, nor is boration absolutely critical to its practice. For example, polyvinylene sheet 10 can be submerged and allowed to soften and/or swell (cf., "relax") in boric bath 400, subsequently removed, and then extended. Likewise, polyvinylene sheet 10 can be extended and then submerged into boric bath 400. In an extreme but nonetheless viable case, the polyvinylene sheet 10 can be extended without any pre-, post-, or contemporaneous boration. As practitioners will note, however, presoaking or contemporaneous soaking in a boric ion containing solution greatly facilitates the extension of polyvinylene sheet 10, and as such are desirably practiced when extending sheet 10.

Further, although FIG. 2 depicts only a single bath, boration can employ two (or more) baths. For example, in a two-bath boration, the first bath can contain water, and the second, a boric ion contributing species. Alternatively, the order can be reversed or both baths may contain varying concentrations and/or mixtures of boric ion contributing species. Extension can be conducted in any one of these baths.

When polyvinylene sheet 10 is borated, the boration solution will generally comprise boric acid and either sodium or potassium hydroxide, or a substance from the class consisting of the sodium and potassium borates, preferably borax. The concentration of boric acid and borax or other borate in the solution or solutions to which the oriented polarizing sheet is subjected are not critical. Preferably, the boric acid is present in higher concentration than the borax or other borate, and a preferred concentration comprises 9% by weight of boric acid and 3% by weight of borax. Other satisfactory concentrations, however, may include solutions of a boric acid concentration of 16% by weight or even higher and a borax concentration of about 6% by weight, or solutions having concentrations of 9% by weight of boric acid and 1% by weight of borax or other variations within the ranges indicated. Preferably, the solutions should contain from 1% to 6% by weight of borax and from about 5% to about 20% by weight of boric acid. Polyvinylene sheet 10 can be imbibed in these solutions for a period of about four minutes or slightly longer with the temperature of the solutions preferably maintained at about 60° C.

Boration of the molecularly oriented polyvinylene sheet 10 is subject to considerable variation. For example, the temperature of the boric acid solution may be varied from approximately room temperature to boiling, and the concentration thereof may be increased at the higher temperatures. It is desirable that the solution be heated at least to near 60° C. in order to accomplish rapid "swelling" of the sheet 10 before cross-linking takes place. At room temperature, the cross-linked material tends to form a barrier layer adjacent the surface of the sheet which effectively resists further penetration by the solution; although it should be noted that the resulting sheet has substantially improved stability.

Other alternative boration methodologies and the effects obtained thereby are explained in the patent literature. For further details concerning boration, reference can be made to U.S. Pats. Nos. 2,445,555, 2,453,186, 2,554,850, and 2,674,159.

Subsequent to the extension step, the resulting high-efficiency light polarizing polyvinylene sheet 10 can again be bonded or laminated to a carrier web 12, the carrier web (shown in FIG. 2 on spool 160) being the same or different from the web stripped off fumed, oriented sheet 10 prior to extension thereof. Supported on web 12, polyvinylene sheet 10 is "taken-up" on roller 110 with comparatively greater ease and a reduced frequency of handling defects (e.g., wrinkles, creases, and the like).

In contrast with the bonding of oriented sheet $10_O$ onto a carrier web or supporting substrate, the rebonding of high-efficiency light-polarizing polyvinylene sheet need not be accomplished with an acid solution. Any of a variety of adhesives can be used for the lamination including polyvinyl alcohol adhesives and polyurethane adhesive materials. Inasmuch as polarizers are normally employed in optical applications, an adhesive material which does not have an unacceptable effect on the light transmission properties of the polarizer are typically employed. The thickness of the adhesive material will vary with the particular application. In general, thicknesses of about 0.25 mil (0.006 mm) to about 1.0 mil (0.025 mm) are satisfactory.

The present invention will now be described in further detail by the following non-limiting examples of several of its embodiments. Unless otherwise indicated, all parts, percents, ratios, and the like are by weight.

EXAMPLES

Example 1

A sheet approximately 2 mils thick (50.754 $\mu$m) of a high molecular weight polyvinyl alcohol (98.0% or greater hydrolysis) was unidirectionally stretched 3.6 times its original length, under the influence of moderate heat (~125° C.). The oriented sheet was then brought into interfacial association with a carrier web at a nip between two pressure rollers. The carrier web comprised polyethylene terephthalate and was approximately 7 mils thick (177.639 $\mu$m). A 1N solution of HCl was dripped into the nip in volumes sufficient to produce a uniform interlaminar coverage of approximately $1.77 \times 10^{-4}$ ml/cm$^2$. The bonded oriented sheet was then conveyed through an oven maintained at a temperature of approximately 300° F. (149° C.). The residence time in the oven was approximately 3 minutes, during which the oriented sheet was converted gradually to a light polarizer (transmittance: roughly 25%) by catalytic dehydration. Visual analysis of the resulting polarizer showed uniform light transmittance across its crossweb axis.

Example 2

A sheet approximately 2 mils thick (50.754 $\mu$m) of a high molecular weight polyvinyl alcohol (98.0% or greater hydrolysis) was unidirectionally stretched 4.8 times its original length, under the influence of moderate heat, i.e., approximately 250° F. (121° C.). The oriented sheet was then routed into interfacial association with a carrier web at a nip between two pressure rollers. The carrier web comprised hydrolyzed cellulose triacetate and was approximately 5 mils thick (126.885 $\mu$m). A 3N solution of HCl was dripped into the nip in volumes sufficient to produce a uniform interlaminar coverage. The bonded oriented sheet was then conveyed through an oven maintained at a temperature of approximately 320° F. (160° C.). The residence time in the oven was approximately 6 minutes, during which the oriented sheet was converted gradually to a light polarizer (transmittance: roughly 3%) by catalytic dehydration. Visual analysis of the resulting polarizer showed uniform light transmittance across its crossweb axis.

Example 3

A sheet approximately 2 mils thick (50.754 $\mu$m) of a high molecular weight polyvinyl alcohol (98.0% or greater hydrolysis) was unidirectionally stretched 4.0 times its original length, under the influence of moderate heat, i.e., approximately 250° F. (121° C.). The oriented sheet was then brought into interfacial association with a carrier web at a nip between two pressure rollers. The carrier web comprised hydrolyzed cellulose triacetate and was approximately 5 mils thick (126.885 μm). A 3N solution of HCl was dripped into the nip in volumes sufficient to produce a uniform interlaminar coverage. The bonded oriented sheet was then conveyed through an oven maintained at a temperature of approximately 240° F. (116° C.). The residence time in the oven was approximately 10 minutes, during which the oriented sheet was converted gradually to a light polarizer (transmittance: roughly 30%) by catalytic dehydration. Visual analysis of the resulting polarizer showed uniform light transmittance across its crossweb axis.

In summary, as evident from Examples 1 to 3, polyvinylene-based polarizers can be obtained in a process wherein acid is introduced as a bonding fluid, rather than by fuming. However, since certain changes and modifications in the method which embody the invention can be made, it is intended that all matter contained in the Examples be considered illustrative, and not definitive.

We claim:

1. A method for making a light polarizer from a polymeric sheet, the polymeric sheet comprising a hydroxylated linear high polymer, the method comprising the steps of:
   (a) unidirectionally stretching the polymeric sheet sufficiently to orient said hydroxylated linear high polymer of said sheet along the stretching direction;
   (b) bonding the oriented sheet to a support, the bonding involving the application of a dehydration catalyst to an interface between said oriented sheet and said support; and
   (c) processing the supported oriented sheet under conditions sufficient to effect catalytic dehydration of the hydroxylated linear high polymer of said sheet, whereby light-absorbing vinylene block segments are formed in said polymer.

2. The method of claim 1, wherein the dehydration catalyst is an acid-containing solution.

3. The method of claim 1, wherein said processing involves heating the supported oriented sheet at a temperature and duration sufficient to effect said catalytic dehydration.

4. The method of claim 1, wherein the hydroxylated linear high polymer is polyvinyl alcohol.

5. The method of claim 1, wherein the polymeric sheet is unidirectionally stretched from approximately 2.0 to approximately 5.0 times its original length.

6. The method of claim 5, further comprising a step wherein said sheet, subsequent to said catalytic dehydration, is unidirectionally extended an additional 10 to 160%, such that the overall degree of stretch is at least 4.8 times that of said original length.

7. The method of claim 6, wherein said sheet is unidirectionally extended in a boric ion containing solution.

8. The method of claim 6, wherein said support is removed from said sheet prior to said unidirectional extension, the same or different support being relaminated onto said sheet subsequent to said unidirectional extension.

9. The method of claim 1, wherein said oriented sheet and said support are brought to an interface at a nip formed by two abutting pressure rollers.

10. The method of claim 9, wherein said application of said dehydration catalyst is performed by dripping said dehydration catalyst into the crotch formed by the interface of said oriented sheet and said support in said nip.

11. The method of claim 10, wherein said dehydration catalyst is a solution of hydrochloric acid.

12. The method of claim 3, wherein heating is conducted at a temperature of approximately 220° F. (104° C.) to 400° F. (204° C.).

13. A light polarizing polyvinylene sheet made in accordance with the method of claim 1.

14. The method of claim 9, wherein the support is a flexible, light-transmissive polymeric carrier web.

15. The method of claim 14, wherein the light-transmissive polymeric carrier web comprises polyester.

16. The method of claim 1, wherein the support is a rigid, light-transmissive substrate.

17. The method of claim 16, wherein the rigid, light-transmissive substrate is a sheet of glass.

* * * * *